(12) United States Patent
Shimomura et al.

(10) Patent No.: US 6,735,000 B2
(45) Date of Patent: *May 11, 2004

(54) IMAGE READING APPARATUS AND METHOD

(75) Inventors: Hidekazu Shimomura, Kawasaki (JP); Hiroshi Sato, Kawasaki (JP); Seiichiro Satomura, Mishima (JP); Mitsuru Kurita, Yokohama (JP)

(73) Assignee: Canon Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/352,298

(22) Filed: Jul. 12, 1999

(65) Prior Publication Data

US 2003/0174370 A1 Sep. 18, 2003

(30) Foreign Application Priority Data

Jul. 14, 1998 (JP) .......................... 10-198790

(51) Int. Cl.$^7$ ................................. H04N 7/46
(52) U.S. Cl. ...................... 358/509; 358/475; 358/513; 358/482
(58) Field of Search ................. 358/509, 475, 358/505, 510, 514, 513; 250/205, 208.1, 234

(56) References Cited

U.S. PATENT DOCUMENTS 5,450,215 A * 9/1995 Iwama ........................ 358/509
6,025,584 A * 2/2000 Yamada ...................... 250/205

FOREIGN PATENT DOCUMENTS

| EP | 0 165 550 A | 12/1985 |
| EP | 0 215 681 A | 3/1987 |
| EP | 0 831 639 A | 3/1998 |

OTHER PUBLICATIONS

European Search Report, Mar. 28, 2002.

* cited by examiner

*Primary Examiner*—Mark Wallerson
*Assistant Examiner*—Negussie Worku
(74) *Attorney, Agent, or Firm*—Morgan & Finnegan LLP

(57) ABSTRACT

This invention relates to an image reading apparatus which eliminates color misregistration upon reading in the sub-scanning direction, which occurs due to different afterglow or persistence characteristics of the respective colors of a light source upon executing the light quantity control of the light source for illuminating an original. Since the light quantity control of the light source is divisionally done a plurality of times in one accumulation period of a solid-state image sensing element, any deviation of the center of gravity in the quantity of light from the center C of one accumulation period can be minimized, and the color misregistration can be eliminated remarkably.

30 Claims, 10 Drawing Sheets

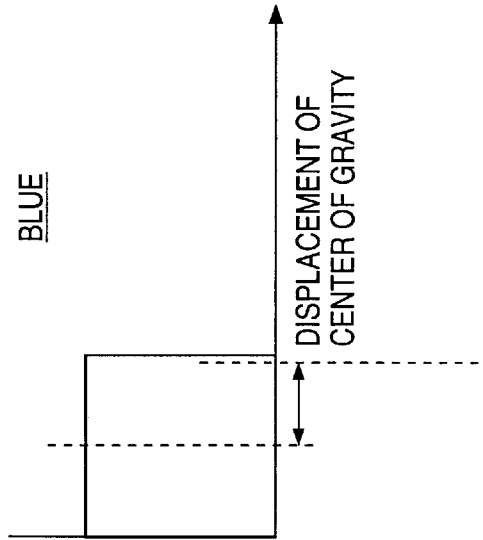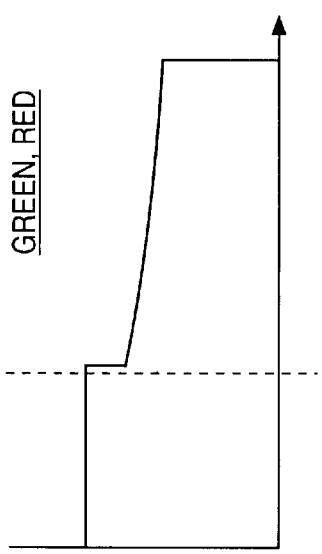
FIG. 1D
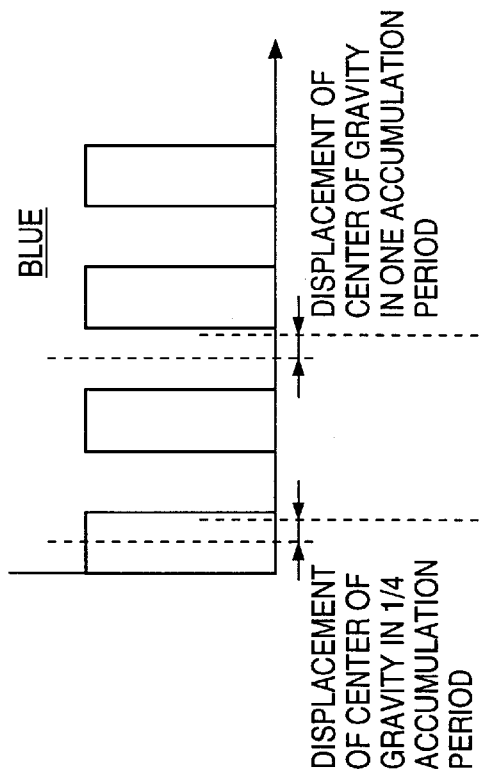
FIG. 1C

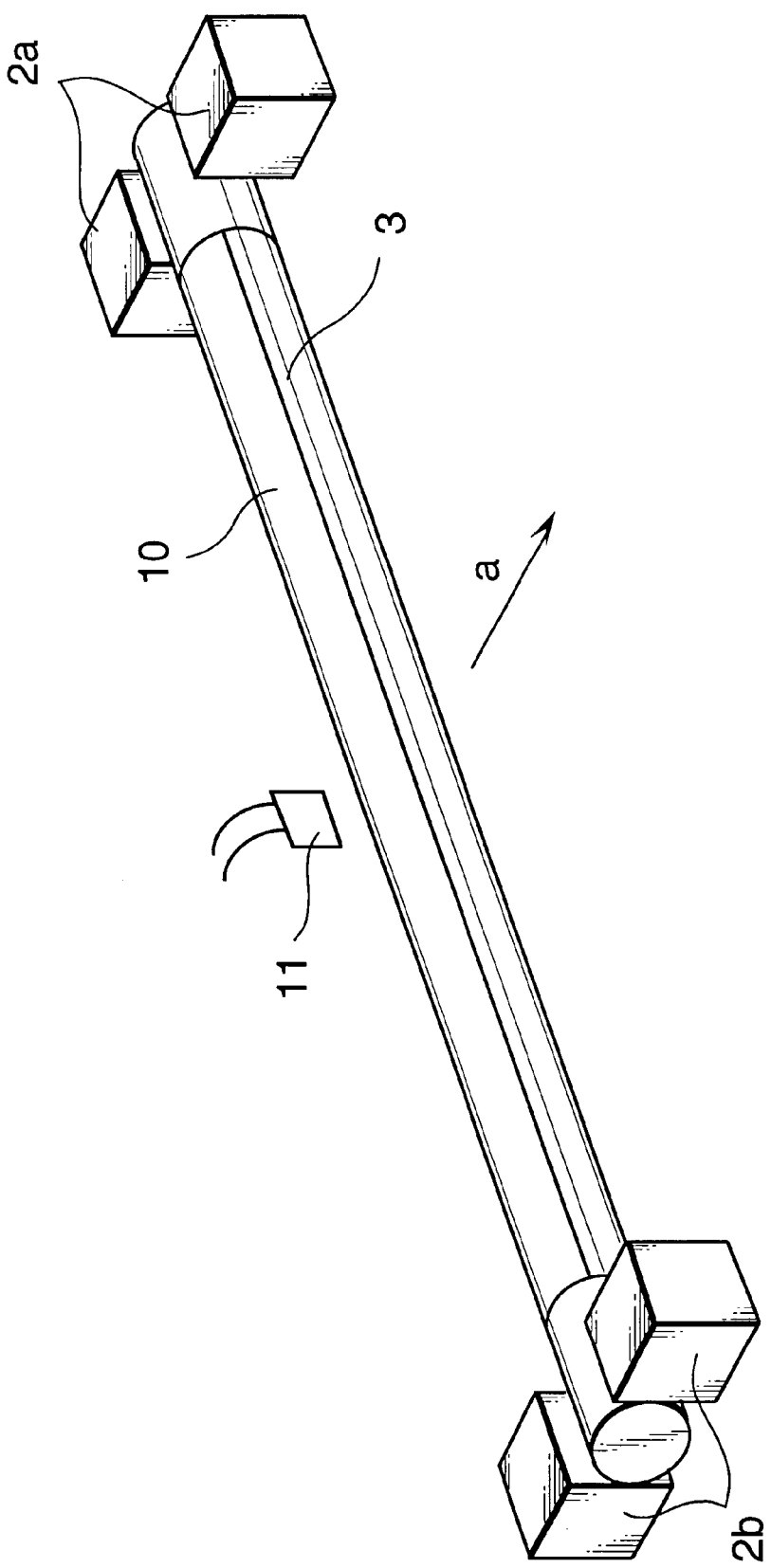

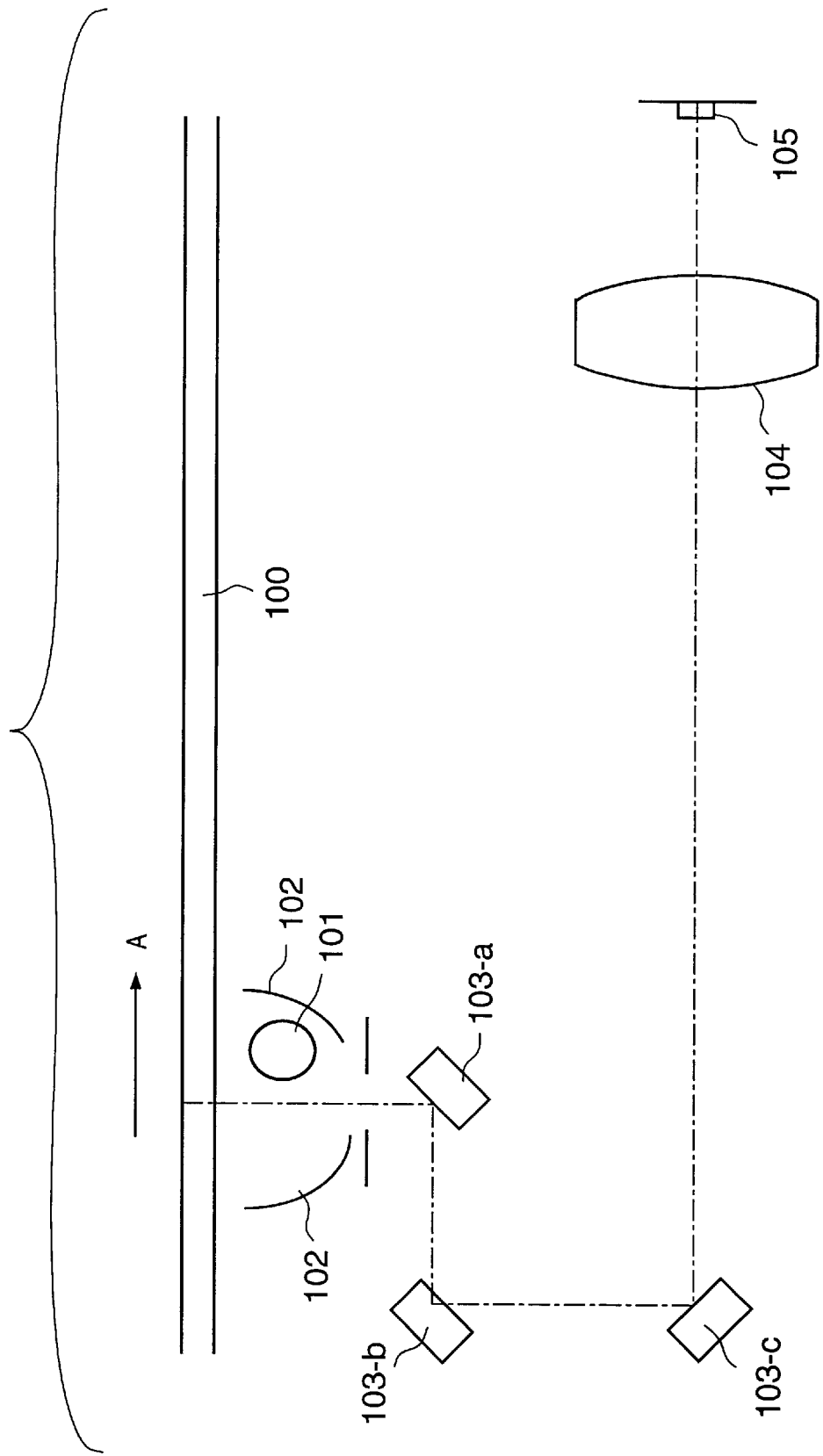

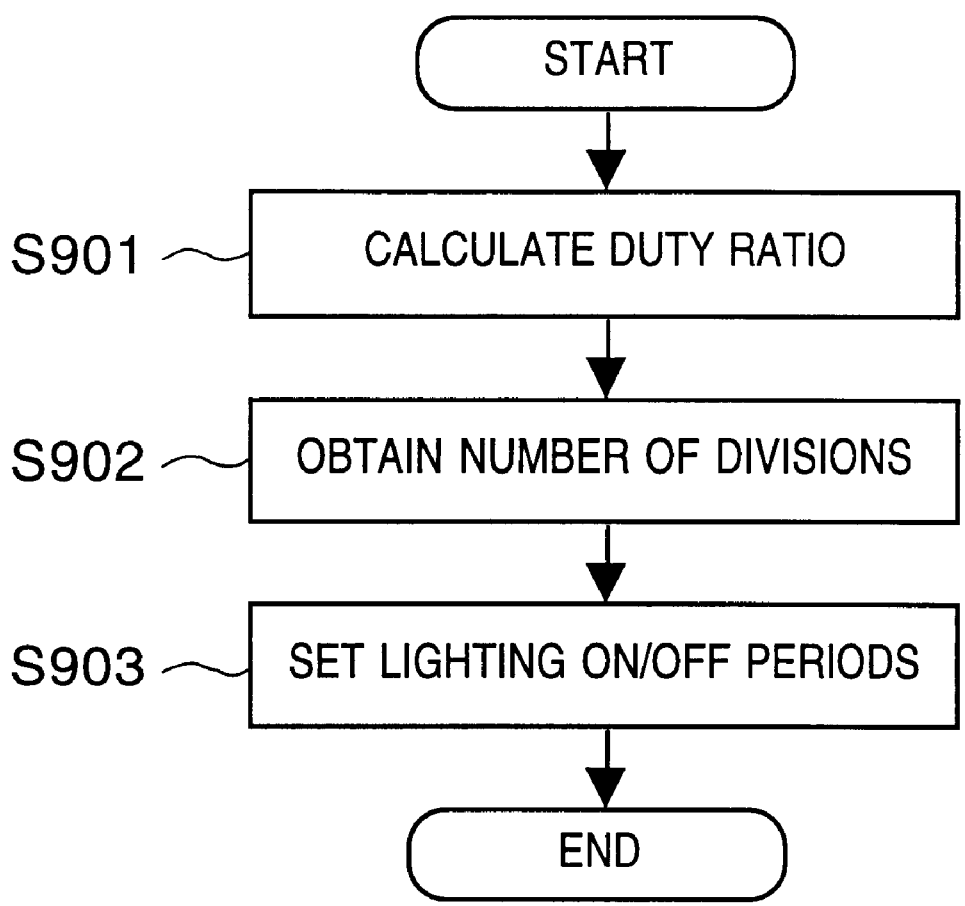

IMAGE READING APPARATUS AND METHOD

BACKGROUND OF THE INVENTION

1. Field of the Invention

The present invention relates to an image reading apparatus and method, and in particular, to an image reading apparatus and method, which form image information of an original illuminated with light coming from a light source on a solid-state image sensing element via an optical imaging system, and read the image.

2. Description of the Related Art

Conventionally, various image reading apparatuses, each of which forms image information of, e.g., an original, on a plurality of line sensors including solid-state image sensing elements such as CCDs, via an optical imaging system, and digitally reads monochrome or color image information on the basis of the output signals from the line sensors, have been proposed.

FIG. 5 is a schematic view of an optical system of a conventional color image reading apparatus.

Referring to FIG. 5, reference numeral 100 denotes a platen glass on which an original to be read is placed; 101, a linear light source for illuminating an original; and 102, a reflector for improving the irradiation efficiency.

Light reflected by an original (not shown) illuminated with light emitted from the linear light source 101 and reflected by the reflector 102 is guided to an optical imaging system 104 via mirrors 103-a, 103-b, and 103-c, and the optical imaging system 104 forms image information of the original on a solid-state image sensing element 105.

The mirror 103-a moves at a scanning speed of v in a sub-scanning direction A of image information of the original, and the mirrors 103-b and 103-c move at a speed of v/2 in synchronism with the movement of the mirror 103-a, thus reading the image information in two dimensions in combination with the line-up direction (main scanning direction) of line sensors in the solid-state image sensing element 105.

In this arrangement, the image information formed on the solid-state image sensing element 105 is converted into an electrical signal and output. The electrical signal is sent to an output device (not shown) to output image information as a printout, or is sent to a storage device or the like to store the image information. Thus, the image reading apparatus is used for various purposes.

As a light source for an image reading apparatus of this type, a halogen lamp is generally used. Since the halogen lamp has high luminance but causes considerable temperature rise in the apparatus resulting from heat it produces and consumes electric power of 200 to 300 W, power consumption required for the entire apparatus increases.

In recent years, to avoid such problems, a high-luminance fluorescent and xenon lamps have been developed, and are used as the light sources of image reading apparatuses.

In most of fluorescent and xenon lamps, a small quantity of mercury grains and several Torr of Ar, Kr, Xe gas, or the like are sealed in a linear hollow tube, which has a structure in which the inner wall of the tube is coated with various fluorescent materials, and electrodes are placed at the two ends of the tube to tightly seal the tube.

The fluorescent material coated on the inner wall of the tube is excited by ultraviolet rays radiated from mercury or various kinds of gases due to discharge from the electrodes, and visible light is emitted in accordance with the emission characteristics of the fluorescent material. An appropriate fluorescent material is selected in accordance with the spectral energy characteristics required for the intended light source.

Especially, a color image reading apparatus requires a light source having a broad wavelength range corresponding to, e.g., RGB. When a light source having especially high luminance is required, a plurality of colors of fluorescent materials are mixed and applied to the inner wall of the tube.

The quantity of light (emission intensity) emitted from the fluorescent or xenon lamp is normally controlled by pulse-width modulation that controls the ON period using a constant current value, in place of a method of controlling the starting voltage unlike the halogen lamp. This is because of the emission characteristics of the fluorescent or xenon lamp, i.e., the lamp emits light when a given current value is exceeded, and the method of controlling the emitted quantity of light by controlling the current value cannot assure a broad control range of the emitted quantity of light.

On the other hand, the following technique has also been proposed. That is, in some image reading apparatuses using a fluorescent or xenon lamp, the aforementioned light quantity control is omitted, and the gain of, e.g., an amplifier for electrically amplifying the output signal from a solid-state image sensing element in accordance with a decrease in quantity of light due to aging is variably set to obtain an appropriate signal output by changing the gain in correspondence with the decrease in light quantity. In such technique, however, the S/N ratio of the read signal may vary depending on the gain value.

The aforementioned prior art suffers the following problems.

An image reading apparatus using a light source such as a fluorescent or xenon lamp, which has a fluorescent material as an emission source, as described in the above prior art, normally uses the technique of controlling the emitted quantity of light by controlling the pulse width corresponding to the ON period while maintaining a constant current value to be supplied to the lamp.

FIG. 6 shows the control waveform for controlling the emitted light quantity from the light source. The abscissa in FIG. 6 plots time, and the ordinate plots the current value that controls the emitted light quantity from the light source.

An Hsync period along the abscissa indicates the time corresponding to one accumulation period of a solid-state image sensing element, i.e., a charge accumulation period in accordance with the quantity of light that hits a light-receiving section of the solid-state image sensing element, as normally used.

Upon executing normal pulse-width control, a control signal is output once per accumulation period in synchronism with the leading or trailing edge position of a trigger signal indicating the start of this accumulation period. In this fashion, the light quantity control is performed in synchronism with a signal corresponding to a trigger signal for one accumulation period, thereby removing noise in an image signal arising from beat produced by interference between the pulse-width control that controls the quantity of light and the accumulation period.

On the other hand, in relation to the fluorescent or xenon lamps that use a fluorescent material as an emission source, a white light source having emission characteristics over the broad wavelength range that covers the entire visible light range obtained by mixing and applying some different color fluorescent materials is normally used in an image reading apparatus for reading color image.

When such white light source is used, a problem is raised due to different afterglow or persistence characteristics unique to the individual color fluorescent materials. The afterglow characteristics are determined by the time of the fluorescent material excited by ultraviolet rays stays at high energy level, and normally diminish exponentially.

This phenomenon suggests that emission remains even after a current that controls emission of the light source is cut off instantaneously and, depending on the characteristics of the fluorescent material used, it is given by:

$$T = e(\tau - 1)$$

where τ is the characteristics determined by the fluorescent material. When fluorescent materials corresponding to RGB are mixed and used like in the white light source used in the color image reading apparatus, the afterglow characteristics of the respective colors are different from each other.

In general, materials used as fluorescent materials are determined in terms of the emission wavelength characteristics and emission efficiency of the materials in the respective wavelength ranges, service life, and the like. For example, the following materials are generally used:

Blue: $BaMg_2Al_{16}O_{27}$
   central wavelength=452 nm
   T=2 μsec
Red: $Y_2O_3:Eu^{2+}$
   central wavelength=611 nm
   T=1.1 msec
Green: $LaPO_5:Ce, Tb$
   central wavelength=544 nm
   T=2.6 msec where T is the decay time of each material, i.e., the time required until the emission time reaches 1/e by decay. In this manner, due to different afterglow characteristics of the respective colors (Blue has especially shorter decay time), the centers of gravity of individual colors read position are different in the sub-scanning direction.

Such phenomenon will be explained using FIG. 6.

The abscissa of the graph shown in FIG. 6 plots time, and the ordinate plots the current amount for driving the fluorescent lamp and the emitted light quantity of the fluorescent lamp.

Normally, the light quantity control (also referred to as lighting control, hereinafter) of the fluorescent lamp is performed once per Hsync period corresponding to one accumulation period of a solid-state image sensing element, and the solid-state image sensing element accumulates a charge proportional to the quantity of incoming light. A lighting control period in FIG. 6 corresponds to the time in which a current for driving the fluorescent lamp is kept supplied by an amount proportional to lighting control duty, and the current during this period is switched ON and OFF in high frequency by a conventional method. When the time corresponding to the lighting control period has elapsed, the emitted light quantity decays. The decay characteristics of the emitted light quantity are determined by the following two factors. One factor is the decay factor of line spectrum emitted from the fluorescent lamp, and the other factor is the decay characteristics of the fluorescent materials mentioned above. One accumulation period which ordinarily corresponds to Hsync is on the order of several hundreds of μsec, while the decay characteristics of line spectrum are 1 μsec or less, resulting in nearly no influence. However, the decay characteristics of the fluorescent materials are on the order of msec, resulting in large influences. Hence, the decay characteristics of the emitted light quantity are determined by the sum total of the two different emitted light quantities, and the decay characteristics of individual emissions.

FIG. 6 also shows an example of the afterglow produced by the decay characteristics of R, G, and B colors.

In the fluorescent lamp which is lighted on to have a nearly constant quantity of light by nearly constant current during the lighting control period, the quantity of light corresponding to line spectrum decays instantaneously after the end of the lighting control period. This portion corresponds to L1 in FIG. 6, and afterglow is produced by the decay characteristics of each fluorescent material with respect to the quantity of light corresponding to L2 in FIG. 6. The afterglow characteristics of the respective colors have the following problems in the image reading apparatus. One accumulation period of the solid-state image sensing element serves as a reference time upon reading image information, and also serves as a reference read position upon reading in the sub-scanning direction. The pixel density upon reading image information is determined by the pixel size of the solid-state image sensing element in the main scanning direction, and corresponds to the moving distance upon image reading scanned by mirrors or the like in the sub-scanning direction.

Hence, the phenomenon that the centers of gravity of the emitted light quantities of the respective colors with respect to Hsync are different in position due to their afterglow characteristics may be considered similarly to which replaces the abscissa of the graph in FIG. 6 with position information. This means that the read position in the sub-scanning direction has different centers of gravity for respective colors.

The different centers of gravity of the respective colors with respect to the read position in the sub-scanning direction cause color misregistration upon reading in the sub-scanning direction, and deteriorate the performance of the image reading apparatus.

SUMMARY OF THE INVENTION

It is an object of the present invention to provide an image reading apparatus which controls the quantity of light emitted from a light source so as to eliminate color misregistration upon reading in the sub-scanning direction due to different afterglow characteristics of the respective colors of the light source that illuminates an original.

It is another object of the present invention to provide an image reading method which eliminates color misregistration upon reading in the sub-scanning direction due to different afterglow characteristics of the respective colors of the light source that illuminates an original.

It is still another object of the present invention to provide a storage medium which stores an image reading method for eliminating color misregistration upon reading in the sub-scanning direction due to different afterglow characteristics of the respective colors of the light source that illuminates an original.

The object of the present invention is achieved by an image reading apparatus of the present invention comprising an original table for placing an original to be read, illumination means, having different afterglow characteristics for respective color components, for illuminating the original placed on the original table, a solid-state image sensing element for converting a received optical signal into an electrical signal, and outputting the electrical signal, an optical system for guiding an optical signal emitted from the illumination means and reflected by the original to the solid-state image sensing element, image output means for performing predetermined processing of the electrical signal output from the solid-state image sensing element, and outputting the processed signal as an image signal, and light quantity control means for controlling a quantity of light emitted from the illumination means, the light quantity control means divisionally executing light quantity control of the illumination means a plurality of times within one accumulation period of the solid-state image sensing element.

With this arrangement, the illumination means is controlled to have a plurality of ON and OFF periods within one accumulation period of the solid-state image sensing element, and the influences of different afterglow characteristics for respective color components are distributed over one accumulation period.

Hence, color misregistration upon reading in the subscanning direction, which occurs due to different afterglow characteristics of the respective colors can be remarkably eliminated upon executing the light quantity control of the light source that illuminates an original.

In the image reading apparatus, the light quantity control means preferably controls the quantity of light emitted from the illumination means by setting a plurality of equal ON periods at equal intervals in one accumulation period of the solid-state image sensing element.

The light quantity control means preferably uses pulsewidth modulation in the light quantity control.

The illumination means may comprise a single light source for simultaneously outputting light beams of a plurality of color components.

Alternatively, the illumination means may comprise a plurality of light sources for respectively outputting light beams of different color components, and may output light by sequentially lighting on the individual light sources.

The illumination means preferably comprises a fluorescent lamp.

In this case, the fluorescent lamp preferably has a mixture of a plurality of types of fluorescent materials having different afterglow characteristics.

Furthermore, the apparatus may further comprise a plurality of solid-state image sensing elements for respectively receiving optical signals of different color components.

The other object of the present invention is achieved by an image reading method of the present invention comprising the illumination step of illuminating an original to be read placed on a original table by illumination means having different afterglow characteristics for respective color components, the light quantity control step of controlling a quantity of light emitted from the illumination means, the light guide step of guiding an optical signal emitted from the illumination means and reflected by the original to a solid-state image sensing element via an optical system, the conversion step of converting the received optical signal into an electrical signal by the solid-state image sensing element, and the image output step of performing predetermined processing of the electrical signal output from the solid-state image sensing element, and outputting the processed signal as an image signal, wherein the light quantity control step includes the step of divisionally executing light quantity control of the illumination means a plurality of times within one accumulation period of the solid-state image sensing element, and the conversion step includes the step of reading out a charge accumulated on the solid-state image sensing element after the plurality of times of light quantity control, and converting the readout charge into an electrical signal.

The still other object of the present invention is achieved by a storage medium of the present invention that stores an image reading method which can be implemented by a computer, the image reading method comprising the illumination step of illuminating an original to be read placed on a original table by illumination means having different afterglow characteristics for respective color components, the light quantity control step of controlling a quantity of light emitted from the illumination means, the light guide step of guiding an optical signal emitted from the illumination means and reflected by the original to a solid-state image sensing element via an optical system, the conversion step of converting the received optical signal into an electrical signal by the solid-state image sensing element, and the image output step of performing predetermined processing of the electrical signal output from the solid-state image sensing element, and outputting the processed signal as an image signal, wherein the light quantity control step includes the step of divisionally executing light quantity control of the illumination means a plurality of times within one accumulation period of the solid-state image sensing element, and the conversion step includes the step of reading out a charge accumulated on the solid-state image sensing element after the plurality of times of light quantity control, and converting the readout charge into an electrical signal.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principle of the invention.

FIGS. 1A to 1D are graphs for explaining the principle of an image reading apparatus of the present invention;

FIG. 2 is a perspective view of a fluorescent lamp used in the present invention;

FIG. 5 is a schematic view showing principal part of an optical system of a conventional image reading apparatus;

FIG. 9 is a flow chart showing setups in lighting control.

DESCRIPTION OF THE PREFERRED EMBODIMENTS

Preferred embodiments of the present invention will now be described in detail in accordance with the accompanying drawings.

The principle of light quantity control in an image reading apparatus of the present invention will be explained first.

FIGS. 1A to 1D are graphs for explaining the operations of an embodiment of an image reading apparatus of the present invention. An optical system in this embodiment has the same arrangement as that shown in FIG. 5 mentioned previously, and a description thereof will be omitted.

Figure 1B:
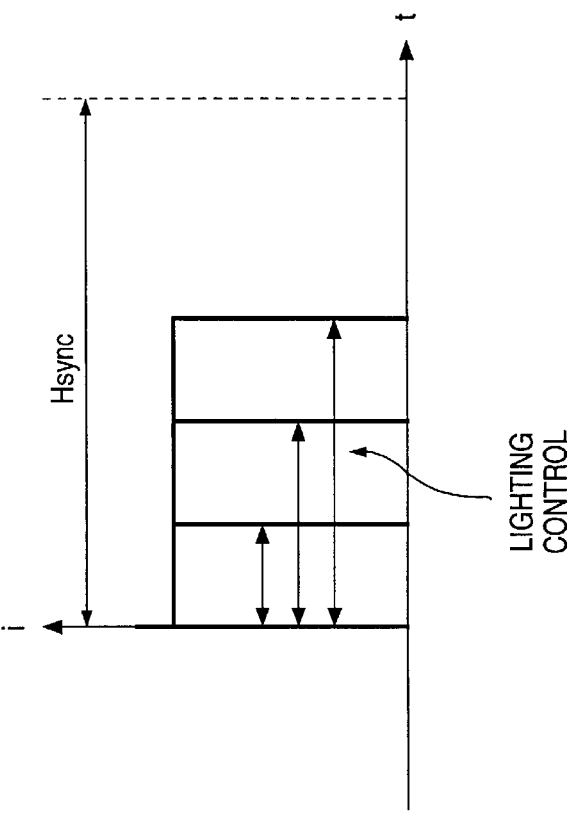
Figure 1A:
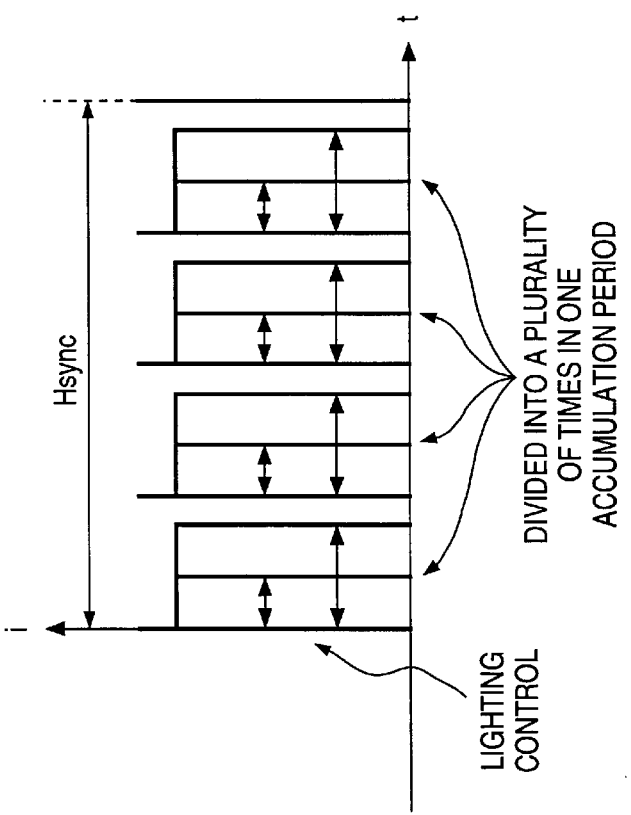

FIG. 1A shows the switch-on method of a fluorescent lamp according to this embodiment, and this method has the following feature compared to FIG. 1B that shows a conventional switch-on method. That is, a lighting control signal is generated once per accumulation period of a solid-state image sensing element in the conventional method, while a trigger signal indicating the start of a lighting control signal is generated four times per accumulation period in this embodiment. In this case, lighting control for each divided period is basically the same as the conventional control.

FIG. 1D shows the displacement of the center of gravity generated by the afterglow or persistence characteristics of the fluorescent light by the conventional control method, and the influences of the different afterglow characteristics of the respective colors are large.

By contrast, FIG. 1C shows the displacement of the center of gravity owing to the afterglow characteristics in the control method of this embodiment.

Since the lighting control is divisionally performed four times per one accumulation period, the displacement of the center of gravity per divided lighting control is reduced to around ¼ of the conventional displacement. Even in the entire one accumulation period, since the displacement is the average of the divided positions of the centers of gravity, the displacement of the center of gravity can also be reduced to about ¼, i.e., to negligible level with respect to deterioration of the performance of the image reading apparatus.

An arrangement that implements the control method of the present invention will be explained below.

Figure 7:
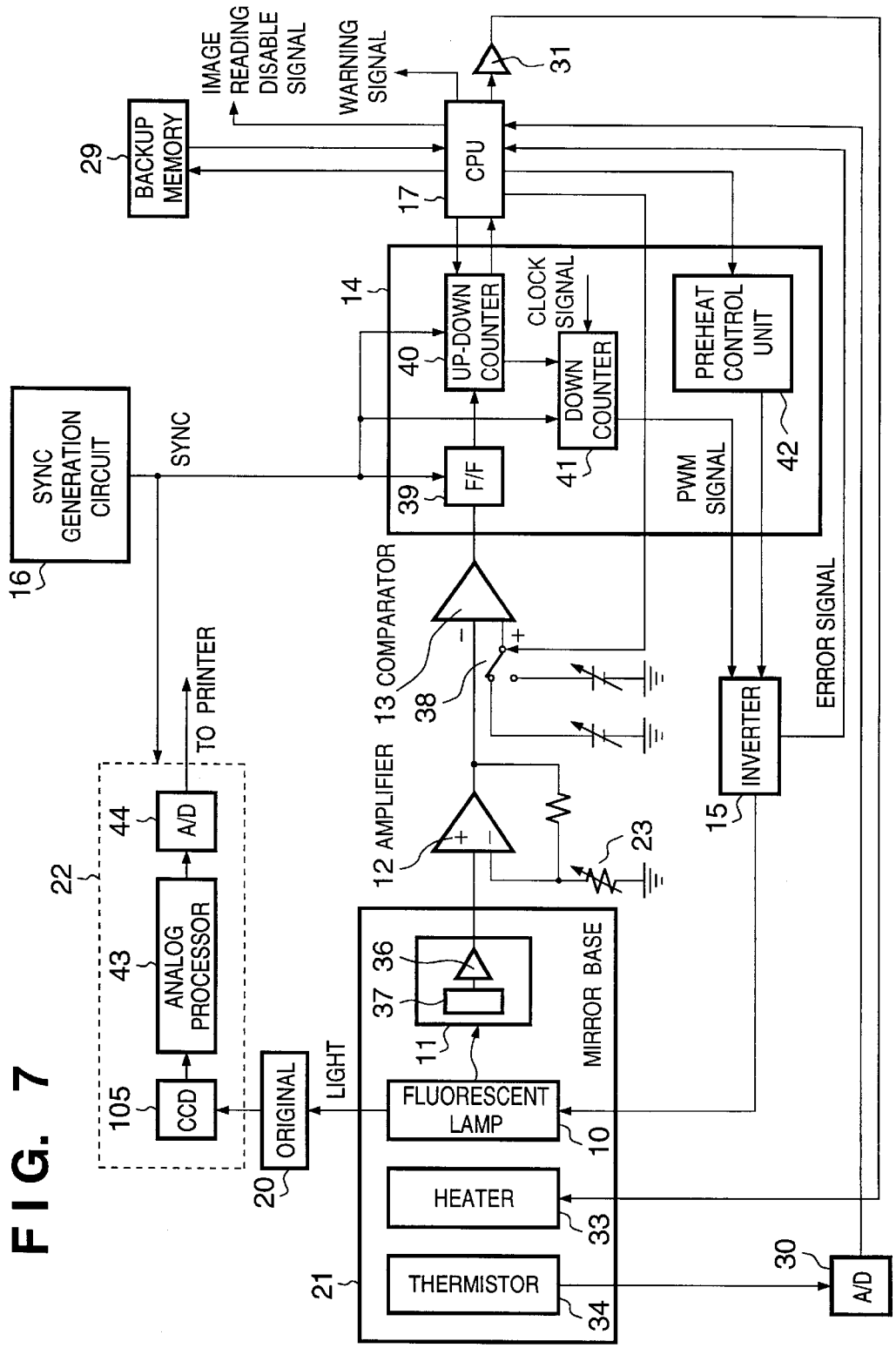
FIG. 7 is a block diagram showing the arrangement of a preferred embodiment of an image reading apparatus according to the present invention.

FIG. 7 is a block diagram showing the arrangement of an embodiment of the image reading apparatus according to the present invention. The image reading apparatus of this embodiment comprises a mirror base 21 for illuminating an original 20, an image processing unit 22 for executing predetermined image processing of an optical signal from the original 20, and outputting an image signal to, e.g., a printer, an amplifier 12 for amplifying a signal from the mirror base 21, a comparator 13 for comparing the output signal from the amplifier 12 with a reference signal, and outputting the comparison result, a light quantity controller 14 comprised of, e.g., an ASIC for controlling the quantity of light on the basis of the output result of the comparator 13, and outputting a PWM signal in phase with a predetermined sync signal, a converter 27 for controlling switch-on operation and the like on the basis of a command from the light quantity controller 14, a CPU 17 for controlling the overall apparatus, and a backup memory 29 for storing the computation results and the like of the CPU 17. Also, reference numeral 30 denotes an A/D converter; 31, a driver; and 16, a SYNC generation circuit for generating a synchronous signal (SYNC).

The mirror base 21 has a fluorescent lamp 10, a heater 33 attached to the fluorescent lamp 10, and a light quantity sensor 11, which is placed in the neighborhood of the fluorescent lamp 10 and comprises a photodiode 37 for detecting the quantity of light emitted from the fluorescent lamp 10, and a preamplifier 36 for converting a small current detected by the photodiode 37 into a voltage signal. The amplifier 12 receives a voltage signal output from the preamplifier 36, and a voltage from a variable resistor 23, and amplifies a light quantity signal to required level.

The comparator 13 switches a switch on the basis of a command from the CPU 17 to lower the quantity of light, e.g., when the original 20 to be read has especially high reflectance, thus switching a reference voltage.

The light quantity controller 14 comprises a flip-flop (F/F) circuit 39 for outputting a light quantity comparison signal from the comparator 13, an up-down counter 40 for counting up/down a counter in synchronism with the sync signal on the basis of the light quantity comparison signal, a down counter 41 for loading the output value from the up-down counter 40 in phase with the sync signal, and counting down the loaded value in response to predetermined clocks to generate a PWM (pulse-width modulation) signal (to be described later), and a preheat control unit 42 for preheating the fluorescent lamp 10 before switch-on. The output value from the up-down counter 40 is input to the CPU 17, which can read a PWM value at an arbitrary timing.

As the operation of the light quantity controller 14, when the quantity of light is larger than a fixed value, the output value from the comparator 13, i.e., the output from the F/F 39, changes to "0", the value of the up-down counter 40 is counted down by a predetermined value to decrease the value to be loaded by the down counter 41 and, as a consequence, the pulse width of the PWM signal to be input to an inverter 15 decreases. Conversely, when the quantity of light is smaller than the fixed value, the output value from the comparator 13, i.e., the output from the F/F 39, changes to "1", the value of the up-down counter 40 is counted up by a predetermined value to increase the value to be loaded by the down counter 41 and, as a consequence, the pulse width of the PWM signal to be input to the inverter 15 increases. Upon power ON, the value of the PWM signal is set at a value corresponding to full ON period of the fluorescent lamp to be converged to the predetermined value.

When the input PWM signal is at high level, the inverter 15 controls to switch on the fluorescent lamp 10 by supplying an alternating current, i.e., tube current at a frequency sufficiently higher than the PWM signal, e.g., a frequency 10 to 100 times higher than the frequency of the PWM signal. On the other hand, when the input PWM signal is at low level, the inverter 15 cuts off the tube current to switch off the fluorescent lamp 10. Electrically, switch-on and switch-off processes of the lamp repeat themselves according to the periods of the PWM signal, but apparently, the fluorescent lamp is lighted on with a constant quantity of light corresponding to the current value obtained by averaging the tube currents.

The image processing unit 22 comprises a CCD 105 that constructs a line sensor for receiving an optical signal reflected by the original 20, and converting the optical signal into an electrical signal, an analog processor 43 for receiving the electrical signal output from the CCD 105, and performing predetermined signal processing, and an A/D converter 44 for converting an analog signal output from the analog processor 43 into a digital signal. Note that the CCD 105 accumulates a charge corresponding to an optical signal received during one scanning period as one period of the sync signal. Hence, the output from the CCD 105 has a magnitude obtained by integrating the quantity of light for one scanning period, and the output corresponding to an image on the reading surface of the original 20 can be obtained by synchronizing the switch-on/switch-off processes of the fluorescent lamp 10 and scans by the CCD 105 to be performed in an identical period.

In the image reading apparatus with the aforementioned arrangement, the quantity of light emitted from the fluorescent lamp is detected by the light quantity sensor, and the light quantity controller executes light quantity control to make the quantity of light emitted from the fluorescent lamp constant.

FIG. 2 is a perspective view of the fluorescent lamp used in this embodiment.

The two ends of the fluorescent lamp 10 are supported by sockets 2a and 2b, and the lamp 10 receives currents from pins (not shown) of the sockets 2a and 2b. An aperture (optical aperture) 3 is formed on a predetermined region of the fluorescent lamp 10 to emit strong light in the direction of arrow a, and to emit relatively weak light from a region other than the aperture 3. The light quantity sensor 11 comprised of, e.g., a photodiode and the like is placed at an appropriate position of the fluorescent lamp 10 to detect the current corresponding to the quantity of light emitted from the fluorescent lamp 10.

Figure 3:
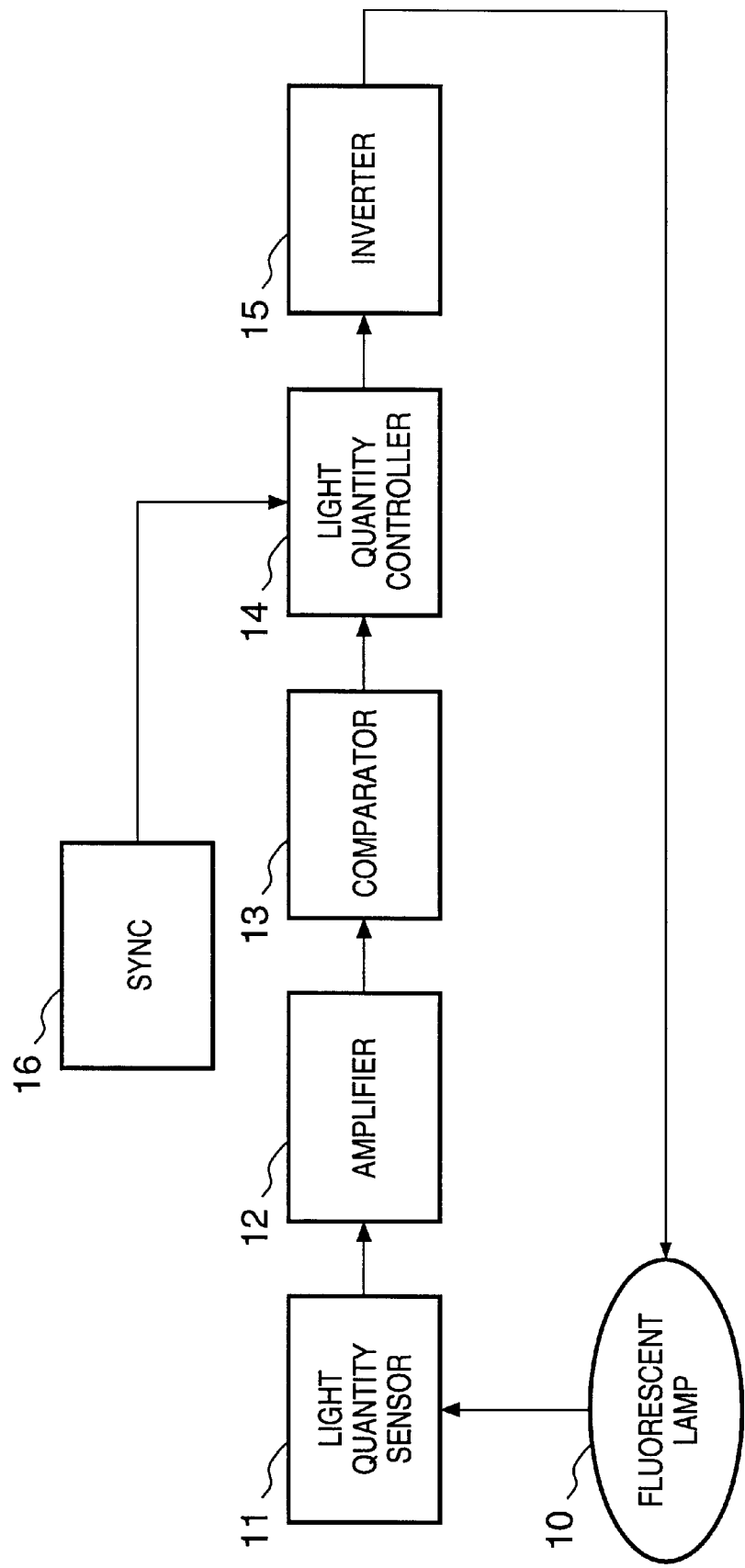
FIG. 3 is a block diagram showing the arrangement of a light quantity control unit in an embodiment of the present invention.

FIG. 3 is a block diagram showing the arrangement of a light quantity control unit in this embodiment.

The light quantity sensor 11 detects the quantity of light emitted from the fluorescent lamp 10, and outputs a light quantity signal corresponding to the detected quantity of light. The light quantity signal is converted into a voltage value by the amplifier 12, and the voltage value is amplified.

After that, the amplified voltage value is compared with a predetermined reference voltage by the comparator 13, and the comparison result is input to the light quantity controller 14. The light quantity controller 14 outputs the PWM signal in phase with a predetermined sync signal (SYNC) input from the SYNC generation circuit 16 to execute duty control.

More specifically, when the voltage value output from the amplifier 12 is larger than the reference voltage, the controller 14 outputs the PWM signal to decrease the duty ratio. On the other hand, when the voltage value output from the amplifier 12 is smaller than the reference voltage, it outputs the PWM signal to increase the duty ratio.

The inverter 15 then controls the tube currents to be supplied to the fluorescent lamp 10 to control the switch-on/switch-off processes of the fluorescent lamp 10, as has been described above with reference to FIG. 7. As a result, the fluorescent lamp 10 electrically repeats switch-on and switch-off in accordance with the periods of the PWM signal, but is apparently lighted on with a constant quantity of light corresponding to a current value obtained by averaging the tube currents.

The output signals on the block circuits shown in FIG. 3, which are obtained by the aforementioned control method, will be explained below with reference to FIGS. 4A and 4B.

As the output signals, the SYNC signal, PWM signal, control current waveform (tube current), and quantity of light will be explained.

Figure 4A:
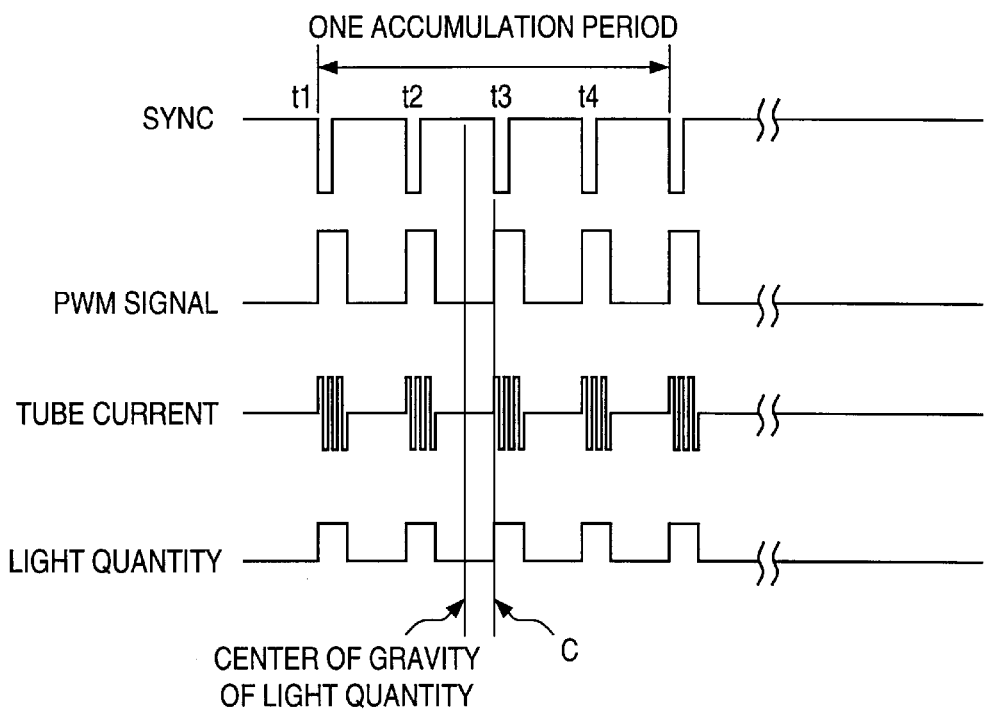
FIGS. 4A and 4B are waveform charts showing the waveforms of the respective units in the embodiment.
Figure 4B:
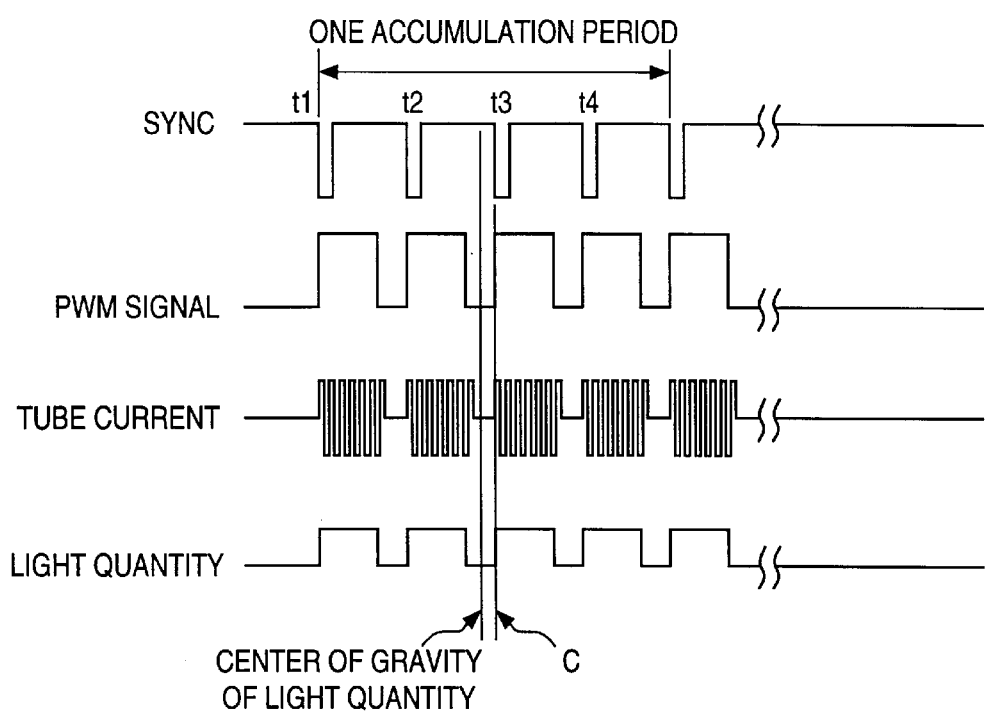
Figure 6:
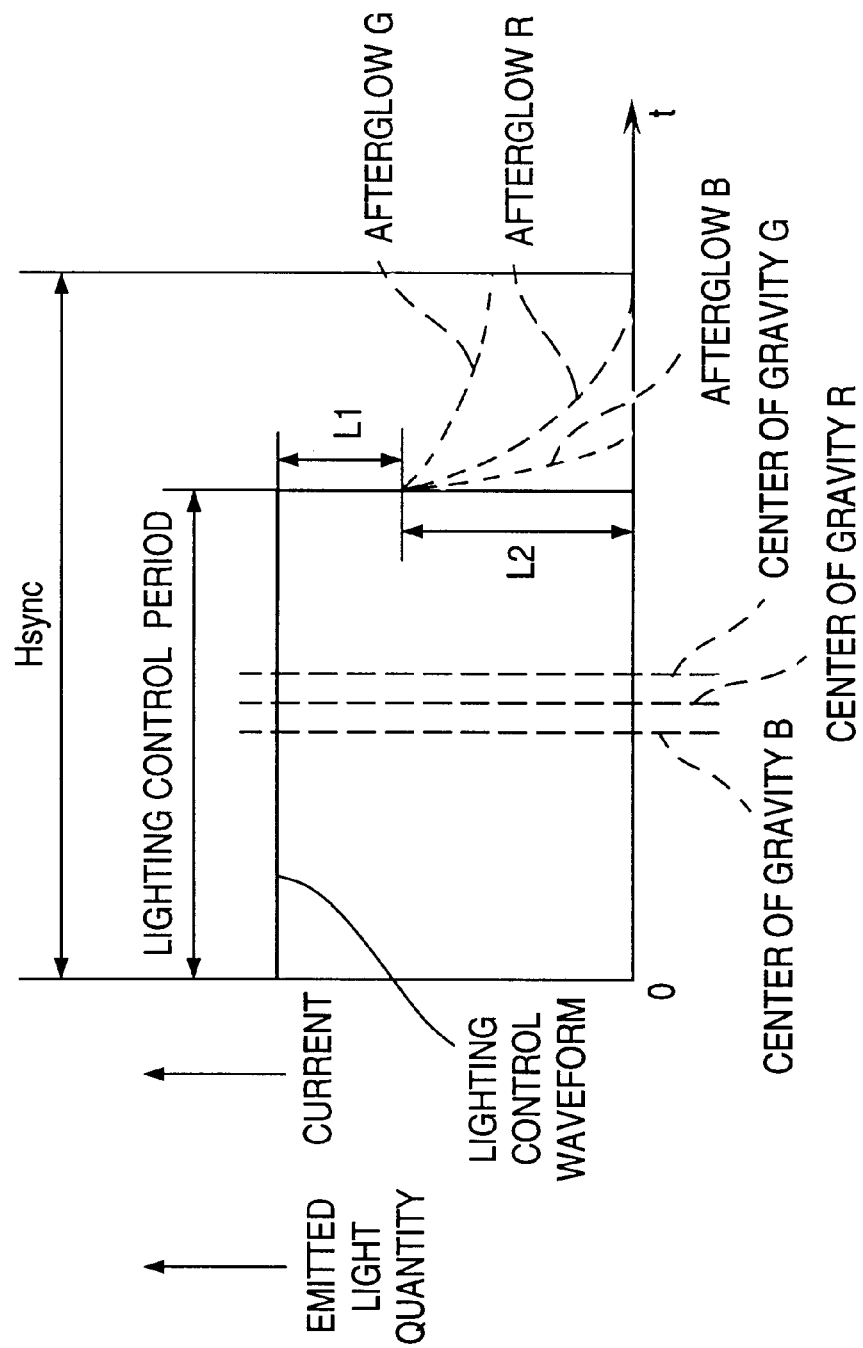
FIG. 6 is a graph for explaining afterglow characteristics in conventional lighting control.

In FIGS. 4A and 4B, the abscissa plots the time, and the ordinate plots the output signals.

FIGS. 4A and 4B respectively show the output signals during one accumulation period when the duty value are about 25% and 60%.

SYNC represents the trigger signal that indicates the start of a lighting control signal output from the SYNC generation circuit 16 in the block diagram shown in FIG. 3, and the trigger signal is generated four times per one accumulation period.

The PWM signal output from the light quantity controller 14 is output with reference to four trailing edges t1, t2, t3, and t4 of the trigger signal, and is kept at high level only during periods of a predetermined duty value.

Based on this PWM signal, the inverter 15 supplies currents to the fluorescent lamp 10 at a frequency sufficiently higher than the PWM signal. The tube currents in FIGS. 4A and 4B indicate that signal.

With the tube currents, the fluorescent lamp 10 is lighted on with a constant quantity of light corresponding to a current value obtained by averaging the tube currents. In this manner, when lighting control is divisionally performed a plurality of times per accumulation period, the centers of gravity of the PWM signal, tube currents, and quantity of light can be set in the vicinity of a center C in one accumulation period.

Since a plurality of times of PWM control is performed per one accumulation period, even when the duty value has changed to around 60%, as shown in FIG. 4B, the center of gravity of the quantity of light is always located near the center C in one accumulation period. With such control, even when respective color fluorescent materials have different afterglow characteristics, the influences of the quantity of light of afterglow during the OFF period can be reduced to about ¼, i.e., to negligible level on an image.

In the description of this embodiment, lighting control is divisionally performed four times per one accumulation period. However, the number of divisions is not particularly limited, and can be appropriately set in relation to the frequency of the high-frequency lighting operation.

As described above, according to the image reading apparatus of this embodiment, when a white light source having fluorescent materials with different afterglow characteristics of the respective colors is used, since the light quantity control of the light source is divisionally performed a plurality of times within one accumulation period of the solid-state image sensing element, the centers of gravity of the quantity of light can always be located in the vicinity of the center of a signal during the Hsync period, and the quantity of light during the OFF period due to afterglow is averaged in one accumulation period, thus minimizing any change in the center of gravity of the quantity of light, and removing color misregistration upon reading in the sub-scanning direction.

In the above embodiment, the light source simultaneously emits three, R, G, and B, color light components. However, the present invention is not limited to such specific light source. For example, even when three, R, G, and B, color light sources emit light in turn, the same effect as in the above embodiment can be obtained by divisionally executing the light quantity control of each light source a plurality of times per one accumulation period of the solid-state image sensing element.

Note that the present invention is not limited to the form of the image reading apparatus but may be implemented in the form of an image reading method.

Figure 8:
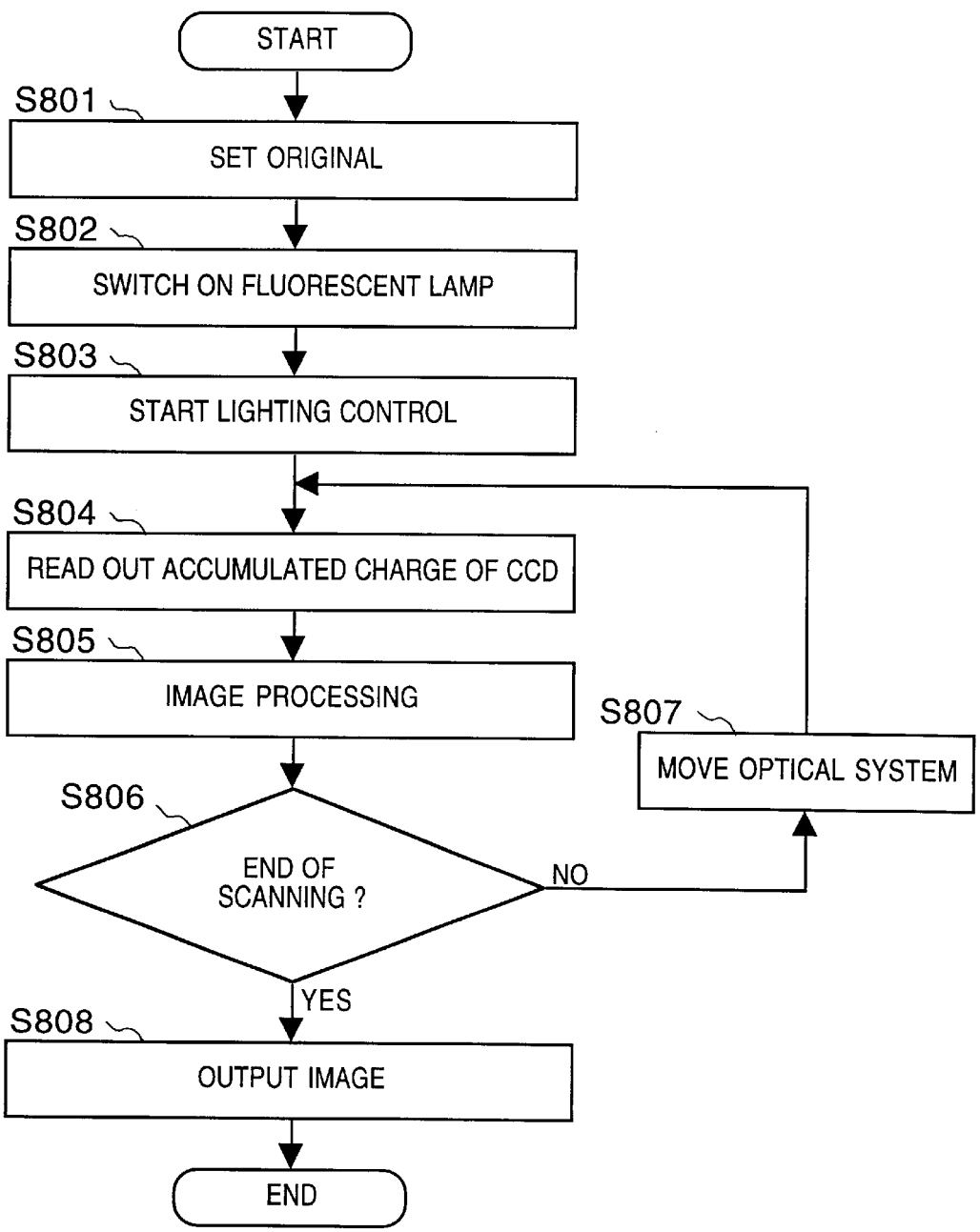
FIG. 8 is a flow chart showing an image reading method of the present invention.

FIG. 8 is a flow chart showing an example of the image reading method according to the present invention. The following explanation will be given under the assumption of reading by an apparatus with the arrangement shown in FIG. 7.

Initially, the operator starts the reading apparatus and sets an original 20 to be read (step S801). The reading apparatus lights on the fluorescent lamp 10 (step S802), and waits until the output from the light quantity sensor 11 is made constant by the light quantity controller 14.

After the quantity of light emitted from the fluorescent lamp 10 becomes stable, an actual read starts. Charge accumulation of the CCD 105 and lighting control by the light quantity controller 14 and inverter 15 are started in synchronism with the sync signal from the SYNC generation circuit 16 (step S803). The accumulated charge is read out for each accumulation period of the CCD 105 (step S804), and image processing for processing the readout signal by the analog processor 43, and storing the processed signal in an image memory, or the like is executed (step S805).

It is checked based on the read data or the displacement of the optical system if scanning of the region to be read of the original is complete (step S806). If scanning is not complete yet, the optical system is moved by a predetermined distance (step S807), and the flow returns to step S804 to read data of the next region.

Upon completion of scanning of the region to be read of the original, image data stored in, e.g., the image memory is output to a printer or the like (step S808), thus ending the processing.

In this example, the CCD 105 has a predetermined number of elements in the sub-scanning direction, and the optical system is moved (step S807) after the image processing for data read by the predetermined number of elements in step S805 is completed. Alternatively, the movement of the optical system and read of the accumulated charge in step S804 may be alternately or simultaneously executed.

A setup example of the lighting control shown in FIGS. 4A and 4B in step S803 will be explained below with reference to the flow chart shown in FIG. 9.

The ratio (duty) of ON period in one accumulation period is calculated based on conditions and the like obtained by the light quantity sensor 11 or set by the operator (step S901). Then, the number of divisions in one accumulation period is obtained (step S902). This number of divisions may be calculated based on the pre-set conditions or the like or may be fixed.

ON and OFF periods are set for each color component on the basis of the duty and the number of divisions, and the lighting control shown in FIGS. 4A and 4B is executed according to the ON and OFF periods for each accumulation period. The set ON and OFF periods are stored in an appropriate memory.

The aforementioned image reading method is an example of the reading method executed by the reading apparatus with the arrangement shown in FIG. 7, and various modifications may be made depending on the arrangements of apparatuses, as is known to those skilled in the art.

Note that the present invention may be applied to either a system constituted by a plurality of devices (e.g., a host computer, an interface device, a reader, a printer, and the like), or an apparatus consisting of a single equipment (e.g., a copying machine, a facsimile apparatus, or the like).

The objects of the present invention are also achieved by supplying a storage medium, which records a program code of a software program that can realize the functions of the above-mentioned embodiments to the system or apparatus, and reading out and executing the program code stored in the storage medium by a computer (or a CPU or MPU) of the system or apparatus.

In this case, the program code itself read out from the storage medium realizes the functions of the above-mentioned embodiments, and the storage medium which stores the program code constitutes the present invention.

As the storage medium for supplying the program code, for example, a floppy disk, hard disk, optical disk, magneto-optical disk, CD-ROM, CD-R, magnetic tape, nonvolatile memory card, ROM, and the like may be used.

The functions of the above-mentioned embodiments may be realized not only by executing the readout program code by the computer but also by some or all of actual processing operations executed by an OS (operating system) running on the computer on the basis of an instruction of the program code.

Furthermore, the functions of the above-mentioned embodiments may be realized by some or all of actual processing operations executed by a CPU or the like arranged in a function extension board or a function extension unit, which is inserted in or connected to the computer, after the program code read out from the storage medium is written in a memory of the extension board or unit.

When the present invention is applied to the storage medium, the storage medium stores program codes corresponding to the aforementioned flow chart (shown in FIG. 8 and/or FIG. 9).

As many apparently widely different embodiments of the present invention can be made without departing from the spirit and scope thereof, it is to be understood that the invention is not limited to the specific embodiments thereof except as defined in the appended claims.

What is claimed is:

1. An image reading apparatus comprising:
   an illumination unit, having different afterglow characteristics for respective color components, adapted to illuminate an original;
   a solid-state image sensing element for converting a received optical signal from the original illuminated with said illumination unit into an electrical signal; and
   a light quantity control unit adapted to control a quantity of light emitted from said illumination unit by divisionally executing light quantity control of said illumination unit a plurality of times within one accumulation period of said sold-state image sensing element,
   wherein said one accumulation period ranges from a start of receiving the optical signal to completion of converting the optical signal into the electrical signal to be read out as an output from said solid-state image sensing element at one time.

2. The apparatus according to claim 1, wherein said light quantity control unit controls the quantity of light emitted form said illumination unit by setting a plurality of equal ON periods at equal intervals in one accumulation period of said solid-state-image sensing element.

3. The apparatus according to claim 1, wherein said light quantity control unit uses pulse-width modulation in light quantity control.

4. The apparatus according to claim 1, wherein said illumination unit comprises a single light source for simultaneously outputting light beams of a plurality of color components.

5. The apparatus according to claim 1, wherein said illumination unit comprises a plurality of light sources for respectively outputting light beams of different color components, and outputs light by sequentially lighting on the individual light sources.

6. The apparatus according to claim 1, wherein said illumination unit comprises a fluorescent lamp.

7. The apparatus according to claim 6, wherein said fluorescent lamp has a mixture of a plurality of types of fluorescent materials having different afterglow characteristics.

8. The apparatus according to claim 6, wherein said light quantity control unit uses pulse-width modulation in light quantity control, and a frequency of the pulse-width modulation signal is lower than that of a tube current which is supplied to said fluorescent lamp.

9. The apparatus according to claim 1, further comprising a plurality of solid-state image sensing elements for respectively receiving optical signals of different color components.

10. An image reading method comprising:
    illuminating an original with an illumination unit having different afterglow characteristics for respective color components;
    controlling a quantity of light emitted from said illumination unit; and
    converting the received optical signal from the original illuminated with said illumination unit into an electrical signal by a solid-state image sensing element,
    wherein said one accumulation period ranges from a start of receiving the optical signal to completion of converting the optical signal into the electrical signal to be read out as an output from said solid-state image sensing element at one time, and the controlling of the quantity of the light emitted from said illumination unit includes divisionally executing light quantity control of said illumination unit a plurality of times within one accumulation period of said solid-state image sensing element.

11. The method according to claim 10, wherein the controlling the quantity of light includes controlling the quantity of light emitted from said illumination unit by setting a plurality of equal ON periods at equal intervals in one accumulation period of said solid-state image sensing element.

12. The method according to claim 10, wherein the controlling the quantity of light includes the step of executing light quantity control by pulse-width modulation.

13. The method according to claim 10, wherein the illuminating includes simultaneously outputting light beams of a plurality of color components using a single light source.

14. The method according to claim 10, wherein the illuminating includes outputting light by sequentially lighting on a plurality of light sources for respectively outputting light beams of different color components.

15. The method according to claim 10, wherein a plurality of solid-state image sensing elements fir respectively receiving optical signals of different color components are used.

16. The method according to claim 10, wherein the illumination unit includes a fluorescent lamp.

17. The method according to claim 16, wherein a fluorescent lamp having a mixture of a plurality of types of fluorescent materials having different afterglow characteristics is used.

18. The method according to claim 16, wherein the controlling of the quantity of light uses pulse-width modulation, and a frequency of the pulse-width modulation signal is lower than that of a tube current which is supplied to said fluorescent lamp.

19. A computer-readable storage medium that stores an image reading method which can be implemented by a computer, said image reading method comprising:
    illuminating an original by an illumination unit having different afterglow characteristics from respective color components;
    controlling a quantity of light emitted from said illumination unit; and
    converting the received optical signal from the original illuminated with said illumination unit into an electrical signal by a solid-state image sensing element,
    wherein said one accumulation period ranges from a start of receiving the optical signal to completion of converting the optical signal into the electrical signal to be read out as an output from said solid-state image sensing element at one time, and and the controlling of the quantity of light emitted from said illumination unit includes divisionally executing light quantity control of said illumination unit a plurality of times within one accumulation period of said solid-state image sensing element.

20. The medium according to claim 19, wherein the controlling the quantity of light includes controlling the quantity of light emitted from said illumination unit by setting a plurality of equal ON periods at equal intervals in one accumulation period of said solid-state image sensing element.

21. The medium according to claim 19, wherein the controlling the quantity of light includes executing light quantity control by pulse-width modulation.

22. The medium according to claim 19, wherein the illumination unit includes a fluorescent lamp.

23. The medium according to claim 22, wherein a fluorescent lamp having a mixture of a plurality of types of fluorescent materials having different afterglow characteristics is used.

24. The medium according to claim 22, wherein the controlling of the quantity of light uses pulse-width modulation, and a frequency of the pulse-width modulation signal is lower than that of a tube current which is supplied to said fluorescent lamp.

25. The medium according to claim 19, wherein the illuminating includes outputting light by sequentially lighting on a plurality of light sources for respectively outputting light beams of different color components.

26. The medium according to claim 19, wherein a plurality of solid-state image sensing elements for respectively receiving optical signals of different color components are used.

27. The medium according to claim 19, wherein the illuminating includes simultaneously outputting light beams of a plurality of color components using a single light source.

28. A light quantity control apparatus which is used with an image reading apparatus, said image reading apparatus including an illumination unit, having different afterglow characteristics for respective color components, adapted to illuminate an original, and a solid-state image sensing element for converting a received optical signal from the original illuminated with said illumination unit into an electrical signal, said light quantity control apparatus comprising:
    a light quantity control unit adapted to control a quantity of light emitted from said illumination unit by divisionally executing light quantity control of said illumination unit a plurality of times within one accumulation period of said solid-state image sensing element,
    wherein said one accumulation period ranges from a start of receiving the optical signal to completion of converting the optical signal into the electrical signal to be read out as an output from said solid-state image sensing element at one time.

29. A light quantity control method which is uses in an image reading method, said image reading method including illuminating an original with an illumination unit, having different afterglow characteristics for respective color components, and converting a received optical signal from the original illuminated with said illumination unit into an electrical signal buy a solid-state image sensing element, said light quantity control method comprising:

controlling a quantity of light emitted from said illumination unit by divisionally executing light quantity control of said illumination unit a plurality of times within one accumulation period of said solid-state image sensing element, wherein said one accumulation period ranges from a start of receiving the optical signal to completion of converting the optical signal into the electrical signal to be read out as an output from said solid-state image sensing element at one time.

30. A computer-readable storage medium that stores a light quantity control method which is used with an image reading method, said image reading method including illuminating an original with an illumination unit, having different afterglow characteristic for respective color components, and converting a received optical signal from the original illuminated with said illumination unit into an electrical signal by a solid state image sensing element, said light quantity control method comprising:

controlling a quantity of light emitted from said illumination unit by divisionally executing light quantity control of said illumination unit a plurality of times within one accumulation period of said solid-state image sensing element, wherein said one accumulation period ranges from a start of receiving the optical signal to completion of converting the optical signal into the electrical signal to be read out as an output from said solid-state image sensing element at one time.

* * * * *